United States Patent
Tisserand et al.

(10) Patent No.: US 9,960,718 B2
(45) Date of Patent: May 1, 2018

(54) CONTROL LOOP OF A DIGITAL CONTROL DEVICE OF A ROTARY ELECTRICAL MACHINE WITH EXCITATION FOR A MOTOR VEHICLE

(71) Applicant: VALEO EQUIPEMENTS ELECTRIQUES MOTEUR, Creteil (FR)

(72) Inventors: Pierre Tisserand, Limeil Brevannes (FR); Pierre Chassard, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days. days.

(21) Appl. No.: 15/317,454

(22) PCT Filed: Jun. 1, 2015

(86) PCT No.: PCT/FR2015/051431
§ 371 (c)(1),
(2) Date: Dec. 9, 2016

(87) PCT Pub. No.: WO2015/189496
PCT Pub. Date: Dec. 17, 2015

(65) Prior Publication Data
US 2017/0133964 A1    May 11, 2017

(30) Foreign Application Priority Data
Jun. 11, 2014   (FR) .................................... 14 55284

(51) Int. Cl.
*H02P 9/30* (2006.01)
*G05F 1/575* (2006.01)

(52) U.S. Cl.
CPC .............. *H02P 9/305* (2013.01); *G05F 1/575* (2013.01)

(58) Field of Classification Search
CPC ...................................................... H02P 9/305
See application file for complete search history.

(56) References Cited

U.S. PATENT DOCUMENTS

| 5,296,798 A | 3/1994 | Pierret et al. |
| 5,982,155 A | 11/1999 | Rechdan et al. |

(Continued)

FOREIGN PATENT DOCUMENTS

| EP | 0481862 A1 | 4/1992 |
| EP | 0523586 A2 | 1/1993 |

(Continued)

OTHER PUBLICATIONS

Cuoghi Stefania et al, "Direct and exact methods for the synthesis of discrete-time proportional-integral-derivative con", IET Control Theory and Applications, The Institution of Engineering and Technology, GB, (Dec. 12, 2013), vol. 7, No. 18, doi:10.1049/IET-CTA. 2013.0064, ISSN 1751-8644, pp. 2164-2171, XP006047357 [A] 1-10 * the whole document *.

(Continued)

*Primary Examiner* — Viet Nguyen
(74) *Attorney, Agent, or Firm* — Berenato & White, LLC

(57) ABSTRACT

The invention relates to a control loop (10) which is installed in a voltage regulator of a motor vehicle alternator and controls an output voltage of the latter by adjusting an excitation current of the alternator. The control loop includes, at the input, means for measuring (31) the output voltage by sampling, generating a measurement signal (Um), error-calculation means (13) generating an error signal (e) equal to a difference between the measurement signal (Um) and a set value (Uo), means for processing the error signal (e) including an amplifier (14) and generating a control signal (Ysat) and, at the output, means (35) for generating a control signal (PWM) controlling excitation control means in accordance with the control signal (Ysat).

(Continued)

According to the invention, the processing means also include a phase-advance filter (24).

19 Claims, 5 Drawing Sheets

(56) References Cited

U.S. PATENT DOCUMENTS

| | | | |
|---|---|---|---|
| 9,225,277 B2 | 12/2015 | Tisserand et al. | |
| 2007/0120424 A1* | 5/2007 | Lombardi | H02P 9/305 |
| | | | 307/84 |
| 2009/0167256 A1* | 7/2009 | Maddali | H02P 9/10 |
| | | | 322/25 |
| 2012/0032650 A1* | 2/2012 | Chassard | H02J 7/245 |
| | | | 322/44 |
| 2012/0176100 A1* | 7/2012 | Tisserand | H02P 6/14 |
| | | | 322/24 |
| 2012/0326677 A1* | 12/2012 | Tisserand | H02J 7/245 |
| | | | 322/28 |
| 2013/0313828 A1* | 11/2013 | Moreau | H02K 19/28 |
| | | | 290/44 |
| 2014/0340055 A1* | 11/2014 | Tisserand | H02P 9/48 |
| | | | 322/19 |
| 2016/0294313 A1* | 10/2016 | Chassard | H02P 9/30 |

FOREIGN PATENT DOCUMENTS

| | | |
|---|---|---|
| EP | 0802606 A1 | 10/1997 |
| WO | WO2013083902 A2 | 6/2013 |

OTHER PUBLICATIONS

L Fanucci et al, "An high voltage CMOS voltage regulator for automotive alternators with programmable functionalities and full reverse polarity capability", 2010 Design, Automation & Test in Europe Conference & Exhibition (Date 2010), (Mar. 1, 2010), doi:10.1109/DATE.2010.5457150, ISBN 978-3-98-108016-2, pp. 526-531, XP055179205 [AD] 1-10 * the whole document *.

p. Chassard; L. Labiste; P. Tisserand et al., "An High Voltage CMOS Voltage Regulator for automotive alternators with programmable functionnalities and full reverse polarity capability", Design, Automation & Test in Europe CONFéRENCE & Exhibition (DATE, (2010), EDAA.

* cited by examiner

CONTROL LOOP OF A DIGITAL CONTROL DEVICE OF A ROTARY ELECTRICAL MACHINE WITH EXCITATION FOR A MOTOR VEHICLE

CROSS-REFERENCE TO RELATED APPLICATIONS AND CLAIM TO PRIORITY

This application is a national stage application of International Application No. PCT/FR2015/051431 filed Jun. 1, 2015, which claims priority to French Patent Application No. 1455284 filed Jun. 11, 2014, the disclosures of which are incorporated herein by reference and to which priority is claimed.

FIELD OF THE INVENTION

The present invention relates to a control loop of a digital control device of a rotary electrical machine with excitation for a motor vehicle.

The invention also relates to a digital control device comprising this control loop, as well as to a corresponding rotary electrical machine.

BACKGROUND OF THE INVENTION

In a manner which in itself is known, unlike an electrical machine with permanent magnets, a rotary electrical machine with excitation can produce engine torque, or supply electric energy, only when an excitation current passes through its inductor.

A common type of rotary electrical machine with excitation, which is widely used in the motor vehicle industry for the alternator and starter functions, comprises a rotary inductor and a stator with a plurality of windings.

When the machine is functioning as an alternator, the current which is generated in the stator windings by the rotating inductor is rectified such as to supply direct voltage to the vehicle battery.

This voltage depends on the speed of rotation of the inductor, the connected load and the excitation current.

For motor vehicle applications, the output voltage must be regulated such as to remain constant irrespective of the speed of rotation of the alternator and irrespective of the battery load.

For this purpose, the output voltage is measured and compared continually with a set value by a control device which controls the excitation current such as to cancel out any difference.

The company VALEO EQUIPEMENTS ELECTRIQUES MOTEUR has already proposed to carry out this control on the basis of measurements by sampling by means of digital techniques, which provide substantial advantages in comparison with the conventional analogue methods, in particular in its European patents EP 0 481 862 and EP 0 802.606.

In the design of a modern control device, the subjection of the output voltage to a set value is based on the theorisation of a proportional (P) or proportional integral (PI) control loop.

The creation of this loop by the corresponding algorithms makes it possible to design regulators with programmable functionalities which can adapt more easily to the specifications of the motor vehicle manufacturers, such as the one described in the article "An high-voltage CMOS voltage regulator for automotive alternators with programmable functionalities and full reverse polarity capability", P. Chassard, L. Labiste, P. Tisserand et al, Design, Automation and Test in Europe Conference and Exhibition (DATE), 2010, EDAA.

In the motor vehicle industry, a plurality of characteristics of the alternator make it possible to evaluate the performance of the alternator, in particular the following characteristics:

maximum current supplied according to the speed of rotation for a given regulation voltage;

voltage regulation, i.e. the aptitude of the alternator to generate a voltage corresponding to the set value according to the loads connected;

stability of the system, i.e. the phase margin and the gain margin of the system comprising the regulator, the alternator, a battery and loads.

However the inventive body has observed a decrease in the phase and gain margin in systems comprising high-power alternators.

This decrease can become critical. In fact poor voltage regulation arises which leads to an "oscillating" voltage, or worse still, an alternator output voltage which can no longer be controlled by the regulator. This lack of control can lead for example to excess voltage; reference is then made to an unstable controlled system.

According to arbitrary criteria, the phase margin of the transfer function in an open loop (FTBO) of a controlled system must be more than 45°, and the gain margin must be more than 13 dB in order to consider the system as stable.

However, mostly, for a system which uses a very high-power alternator (which supplies a current of 300 A for example), the respective criteria of the phase margin (>45°) and gain margin (>13 dB) can no longer be complied with for a performance level of the voltage regulation which is identical to that of an alternator with lower power (which for example supplies a current of 100 A). The system is liable to be unstable.

A solution which is well-known in order to compensate for the increase in alternator gain is to create a decrease in the regulator gain.

Unfortunately, in the case of a control loop of the proportional type, the performance of the voltage regulation is affected by the change of the regulator gain.

In fact, although the criteria of stability are improved, the drop in voltage of the voltage regulation according to the current output is then increased, and can reach 600 mV, which is considered to be a deterioration of the performance of the voltage regulation in comparison with a voltage drop of approximately 200 mV for an alternator which outputs 100 A, for example.

A known solution for limiting the voltage drop of the regulation when the regulator gain is decreased is the use of an integral part in the control loop.

The voltage drop can thus be brought to a value close to 0 mV; however, it is known that the phase margin and the gain margin are slightly affected.

There is therefore a need for a solution which would make it possible to increase the phase margin and the gain margin of the transfer function in an open loop of a voltage regulation system associated with a high-power alternator, whilst maintaining the performance of the voltage regulation.

SUMMARY OF THE INVENTION

The objective of the present invention is to fulfil this need, and specifically its subject is a control loop of a digital control device of a rotary electrical machine with excitation for a motor vehicle.

This machine is of the type which can function as a generator supplying an output voltage adjusted by an excitation current.

The digital control device comprises means for controlling the excitation current and the control loop comprising:

as input, means for measurement by sampling of the output voltage generating a measurement signal;

means for error calculation generating an error signal equal to a difference between the measurement signal and a set value;

means for processing of this error signal generating a control signal comprising an amplifier;

as output, means for generation of a control signal which controls the control means according to the control signal.

According to the invention, the control loop according to the invention comprises processing means which additionally comprise a phase advance filter.

A transfer function at Z of this phase advance filter preferably has the form:

$$FT(z) = \frac{1 - (1 - 1/a) \cdot Z^{-1}}{1 - (1 - 1/b) \cdot Z^{-1}}$$

where a is a first predetermined coefficient and b is a second predetermined coefficient such that a>b, and a digital output $Y_{n+1}$ of the phase advance filter is associated with a digital input $X_n$ of this phase advance filter by a recurrence equation with the form:

$$Y_{n+1} = Y_n Z^{-1} - Y_n Z^{-1} 1/b + X_n - X_n Z^{-1} + X_n Z^{-1} 1/a$$

where a and b are respectively the first and second aforementioned predetermined coefficients.

The phase advance filter in question thus comprises means for implementation of this recurrence equation.

Preferably, these means for implementation comprise a multiplier by a predetermined factor at the input of the phase advance filter, and a divider by this predetermined factor at the output.

According to a particular characteristic, the means for implementation additionally comprise an adder and elements for multiplication by values which are the inverse of the first and second predetermined coefficients.

According to another particular characteristic, the phase advance filter is in series with the amplifier.

According to yet another particular characteristic, the means for processing of this control loop additionally comprise an integrator in parallel with this amplifier and the phase advance filter.

These processing means additionally advantageously comprise a saturation block which generates a disconnection signal controlling a switch which disconnects the integrator of the error calculation means in the case of detection of a state of saturation of the control signal.

Preferably, the integrator is a low-pass filter.

According to a particular embodiment, the phase advance filter has a nominal cut-off frequency which is substantially equal to 22 Hz, a transfer function in an open loop of the digital control device with a gain margin substantially equal to 22 dB, and a phase margin substantially equal to 80°.

The invention also relates to a digital control device of a rotary electrical machine with excitation for a motor vehicle, of the type which can function as a generator, distinguished in that it comprises a control loop with the characteristics described above.

The invention also relates to a rotary electrical machine with excitation for a motor vehicle of the type which can function as a generator, comprising this digital control device.

These few essential specifications will have made apparent to persons skilled in the art the advantages provided by the invention in comparison with the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
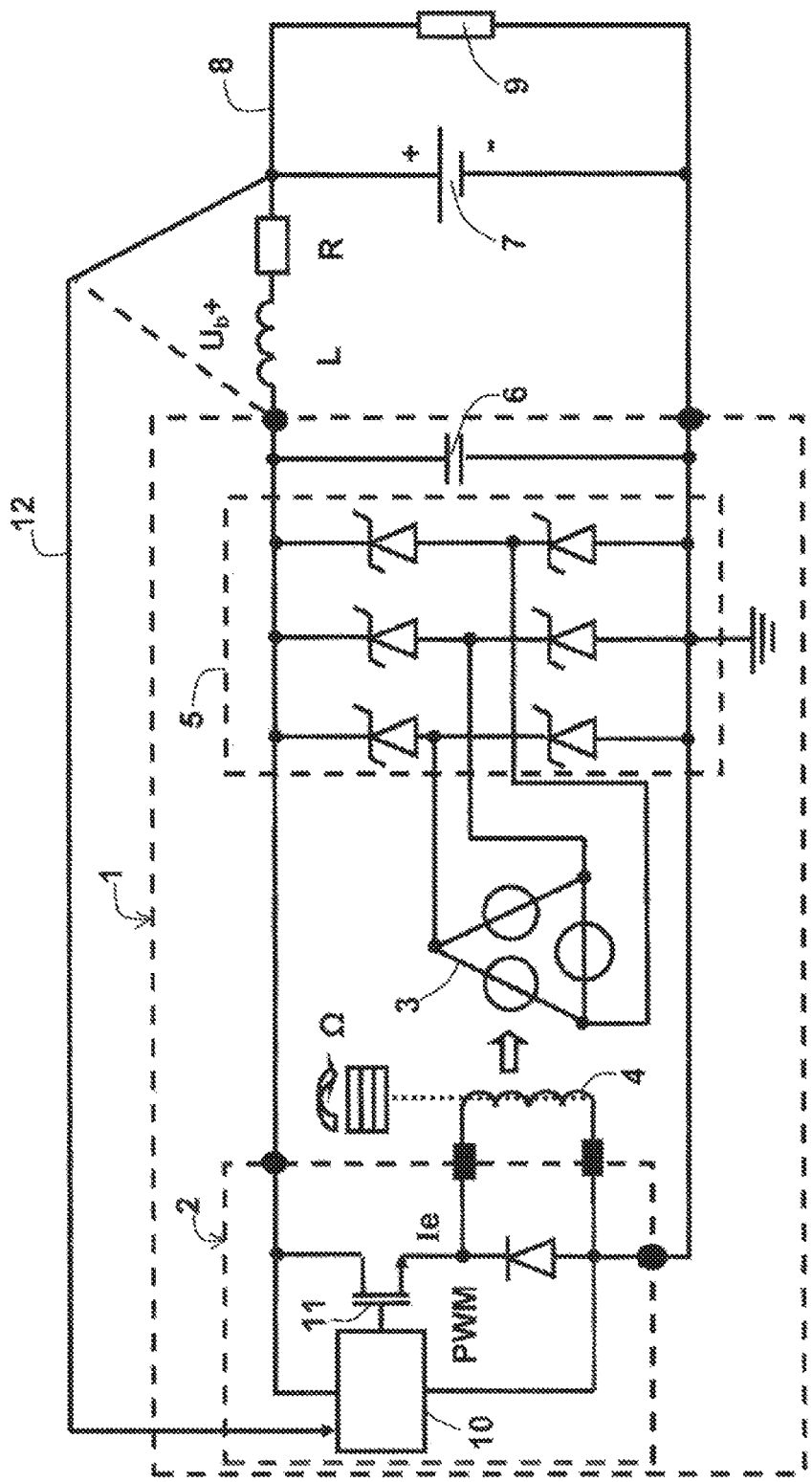
FIG. 1 is a schematic representation of a rotary electrical machine with excitation known in the prior art, provided with a digital control device comprising a control loop, and of its use in the on-board network of a motor vehicle.

The rotary electrical machine with excitation represented schematically in FIG. 1 is, by way of non-limiting example, a three-phase alternator 1 provided with a digital control device 2.

The stator 3 of the alternator 1 comprises three windings which are subjected to the rotary field created by the inductor 4 through which an excitation current $I_e$ passes.

The alternating current which is produced in the stator 3 is rectified by a rectifier block 5 and filtered by a capacitor 6, such that the alternator 1 supplies a direct output voltage $U_b+$ to the battery 7 and to the on-board network of the vehicle 8 which supplies power to the loads 9 (a connection by means of a power cable being schematised by a reactor L and a resistor R).

The output voltage $U_b+$ of the alternator 1 is kept constant when the load 9 and the speed of rotation Ω are varied by means of a control loop 10 which acts on control means 11 of the excitation current $I_e$ on the basis of measurements 12 by sampling of this output voltage $U_b+$.

The control means 11 of the excitation current $I_e$ are generally constituted by power transistors 11 which function with switching and are controlled by a rectangular variable PWM duty cycle signal.

Figure 2:
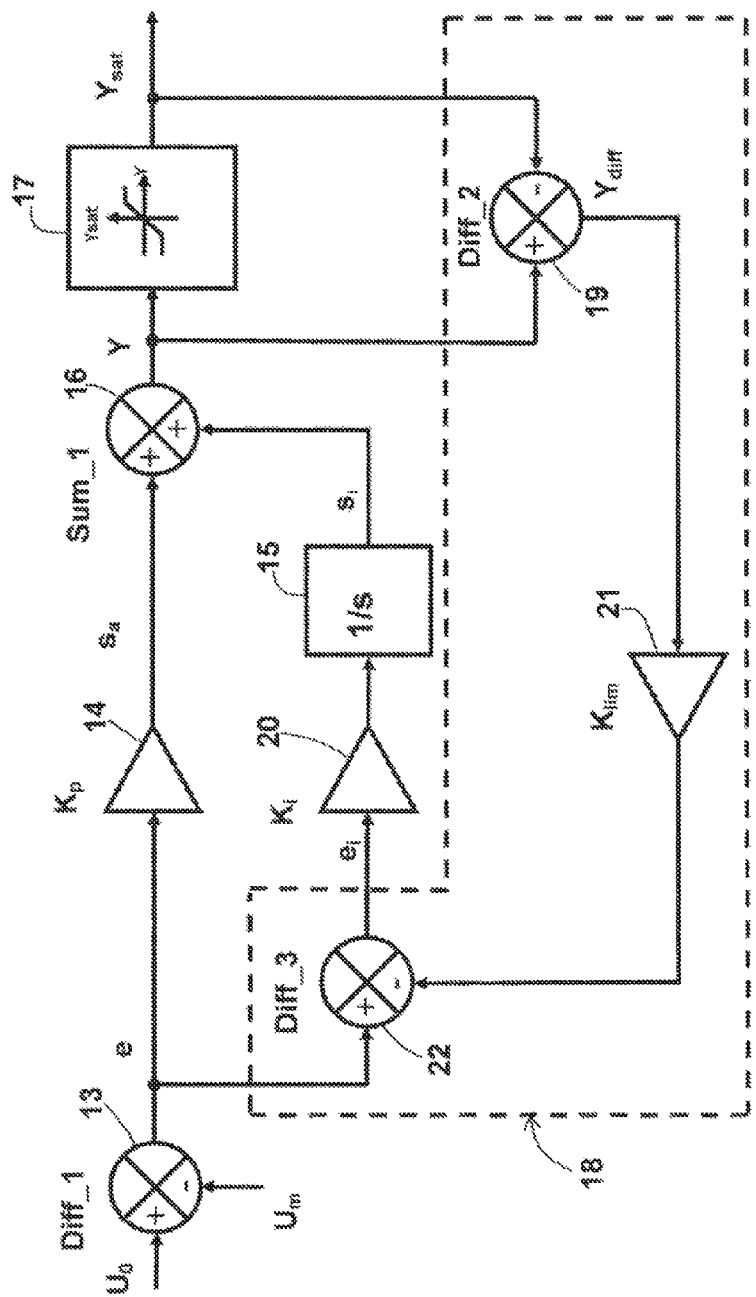
FIG. 2 is a process diagram of a control loop of the digital control device shown in FIG. 1, of a proportional integral type known in the prior art.

In the most recent alternators 1 known in the prior art, the control loop 10 is mostly a proportional integral control loop equipped with an anti-saturation system with calculated feedback of the type shown in FIG. 2.

The control loop 10 comprises at its input measurement means which are generally constituted by an analogue-digital converter in order to sample the output voltage $U_b+$ of the alternator 1 and generate a measurement signal $U_m$ which is compared with a set value $U_o$.

Error calculation means 13 generate with a first operator "Diff_1" an error signal e which is equal to a difference between the measurement signal $U_m$ and the set value $U_o$.

In the parallel structure represented in FIG. 2, the error signal e is amplified, firstly by a first amplifier 14 with a predetermined proportional gain $K_p$, and secondly integrated by an integrator 15.

An output voltage $S_a$ of the first amplifier 14 and an output voltage $S_i$ of the integrator 15 are added 16 in order to produce an intermediate control signal Y.

A saturation block 17 makes it possible to adapt the format of the data of the control loop 10 to that of means for generation of the PWM control signal at the output, by supplying a control signal $Y_{sat}$ from the intermediate control signal Y.

This control loop 10 of a known type additionally comprises an anti-saturation system with calculated feedback 18, the functioning of which is as follows:

Non-Saturated Mode

A value $Y_{diff}$ represents a difference between an error production before saturation Y and after saturation $Y_{sat}$ created by a second operator "Diff_2" 19.

When the loop 10 is not saturated, the value $Y_{diff}$ is zero and does not disrupt the functioning of the proportional integral loop 10 (with a second integrator $K_i$ gain amplifier 20 in series with the integrator 15 having a first transfer function with the form FT=1/s). The anti-saturation system 18 is considered to be disconnected.

Mathematically:

IF $(Y=Y_{sat})$ THEN $e_i=e$ where $e_i$ is an intermediate error signal at the input of the second amplifier 20 preceding the integrator 15.

Saturated Mode

The value $Y_{diff}$ is non-zero in saturated mode.

The value $Y_{diff}$ in saturated mode attenuates to a greater or lesser extent (according to a saturator gain $K_{lim}$ of an additional amplifier 21) the loop error $s_i$ generated by the integral part 15, 20 via a difference created by a third operator "Diff_3" 22.

Mathematically:

IF $(Y \neq Y_{sat})$ THEN $e_i=e-K_{lim}(Y-Y_{sat})$

It should be noted that the structure of the "anti-saturation system with calculated feedback" type 18 comprises two difference operators ("Diff_2" 19 and "Diff_3" 22) and an amplifier $K_{lim}$ applied to a pure integrator 15.

The problem encountered in this type of circuit known according to the prior art is that the use of an integral part 15, 20 in the control loop 10 makes it possible to reduce the control voltage drop when the regulator gain is decreased, but the phase margin and the gain margin are affected.

For the purpose of solving this problem, the inventive body has studied the possibility of adding phase advance filtering in in the control loop 10 which controls the alternator 1, if the loop comprises in particular an integral part 15, 20, 23, as will be explained in association with FIG. 6.

Figure 3:
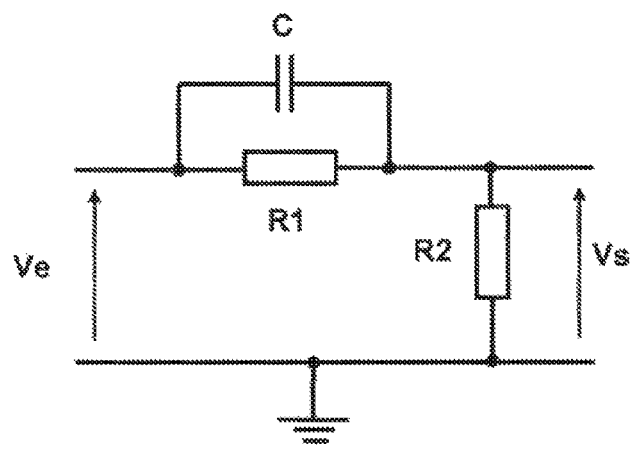
FIG. 3 is an analogue representation of a type of phase advance filter implemented in the control loop according to the invention.

An analogue representation of a type of phase advance filter studied is shown in FIG. 3.

The transfer function of this advance filter with the form (R1=R2=R is selected for simplified calculation):

$$\frac{V_s}{V_e} = \frac{1}{2}\left[\frac{1+j\omega\tau}{1+j\omega\frac{\tau}{2}}\right]$$

where $\tau=RC$

It will be noted that with a very low frequency there is attenuation of a value of ½, i.e. −6 dB (20×log 0.5 equal is −6 dB).

This attenuation value can be adjusted if lesser or greater attenuation is required according to the control of the system by selecting appropriate values of R1 and R2.

The low-frequency gain of this circuit is in fact provided by the equation R2/(R1+R2).

It will also be noted that this phase advance filter is broken down into two basic filters:

a "derivative" part (mathematical part situated at the numerator) which has a first cut-off frequency $f_{c1}=1/2\pi\tau$;

an integral part (mathematical part situated at the denominator) which has a second cut-off frequency $f_{c2}=/\pi\tau$ greater than the first cut-off frequency $f_{c1}$.

Within the context of a digital embodiment 24, it is thus possible to have an approach similar to the analogue study by using a transfer function at Z of the type:

$$FT(z) = \frac{1-(1-1/a)\cdot Z^{-1}}{1-(1-1/b)\cdot Z^{-1}}$$

For the digital creation of a phase advance filter 24, the first predetermined coefficient a is greater than the second predetermined coefficient b.

Figure 4A:
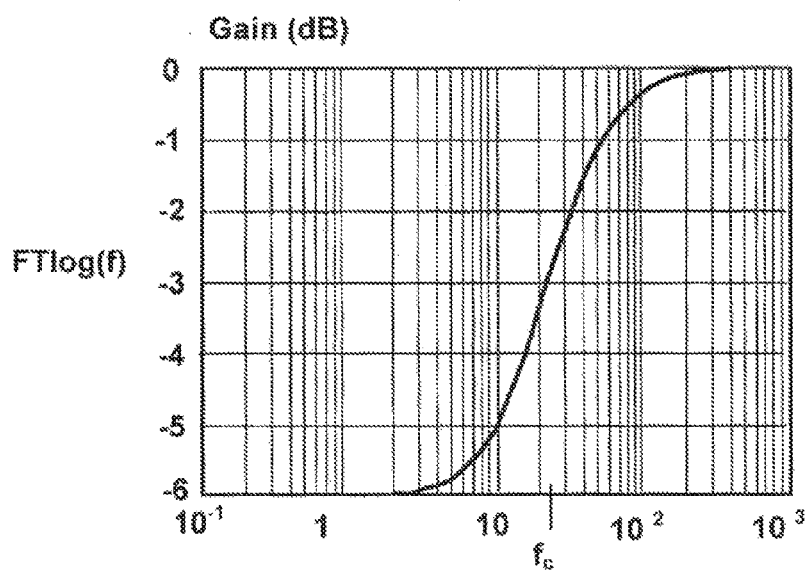
FIGS. 4a and 4b show a frequential response of a digital embodiment of the phase advance filter shown in FIG. 3 (gain and phase respectively).
Figure 4B:
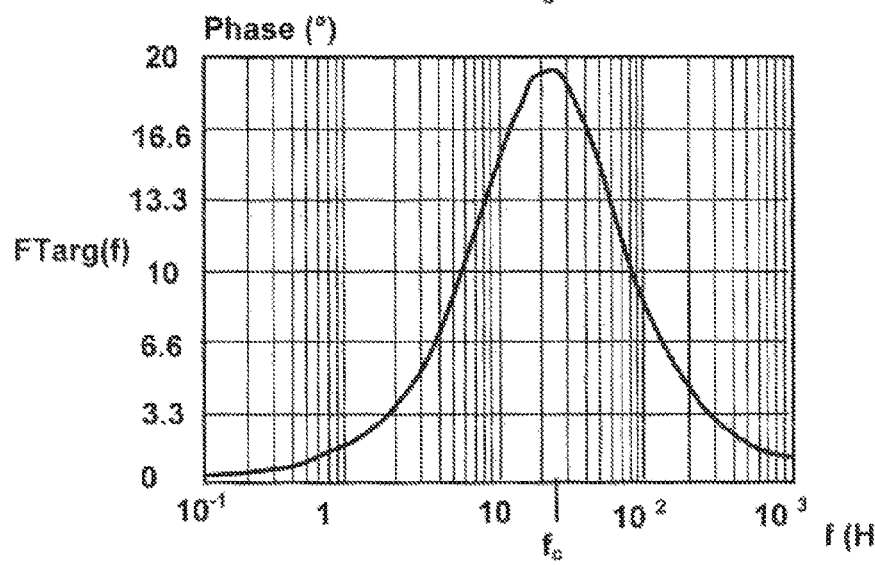

FIGS. 4a and 4b show an example of frequential response of a filter 24 of this type for a=2048, b=1024, and a sampling frequency $f_e$=100 kHz using the equation $$Z(f) = e^{j2\pi\frac{f}{fe}}$$

The frequential response of the digital phase advance filter 24 is in fact virtually similar to that of the analogue phase advance filter (same characteristics, i.e. a "derivative" part and an "integral" part).

Figure 5:
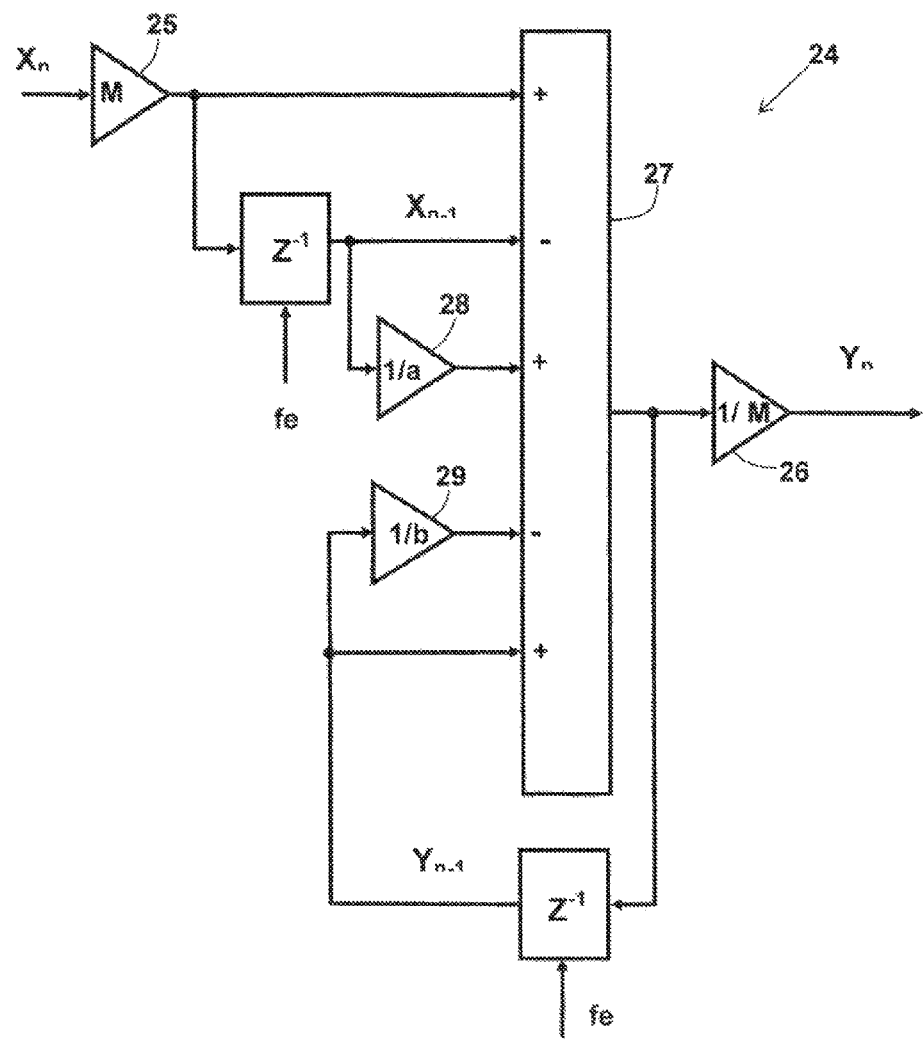
FIG. 5 is a process diagram of a form of digital implementation of a phase advance filter implemented in a preferred embodiment of the control loop according to the invention.

A form of digital implementation 24 shown in FIG. 5 can be provided by analysing a recurrence equation deduced from the transfer function at Z with the form:

$$Y_n = Y_n Z^{-1} - Y_n Z^{-1} 1/b + X_n - X_n Z^{-1} + X_n Z^{-1} 1/a$$

A multiplier 25 by a predetermined factor M at the input makes it possible to increase the precision of calculation of the phase advance filter 24; the result at the output of the filter 24 is then divided by this predetermined factor M by a divider 26.

As shown clearly in FIG. 5, the phase advance filter 24 according to the invention is also implemented by means of an adder 27 and elements of multiplication 28, 29 by values which are the inverse of the first and second predetermined coefficients a, b.

Thanks to the multiplier 25 and the divider 26, truncation errors generated by these values are minimised.

Figure 6:
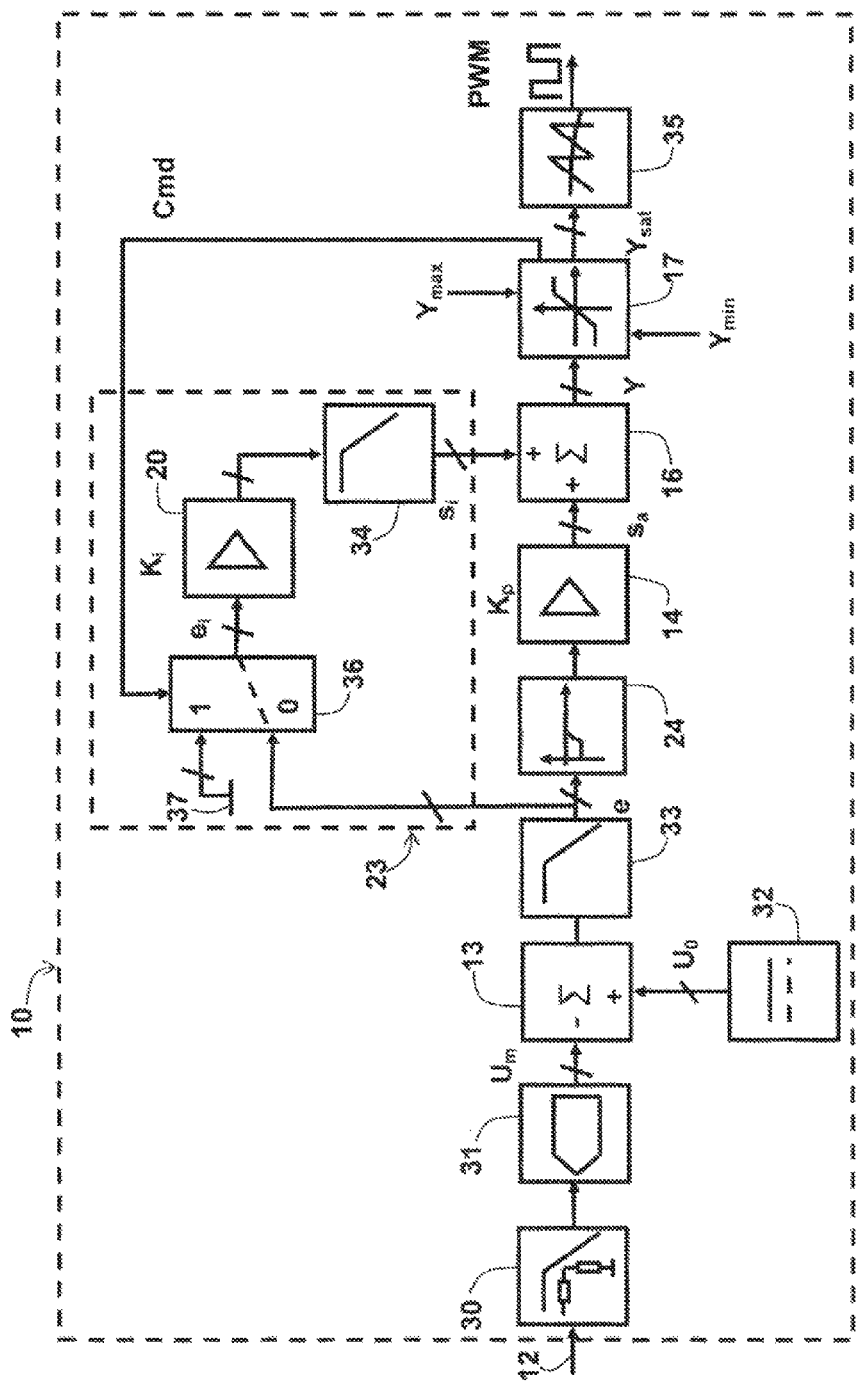
FIG. 6 is a process diagram of a preferred embodiment of the control loop according to the invention.

According to a preferred embodiment of the invention, the different functional blocks of which are shown in FIG. 6, the digital phase advance filter 24 is added in series with the amplifier 14 of the control loop 10.

The description of these functional blocks is as follows:

input signal 12 representing the voltage of the battery 7 or the voltage of the "B+" terminal of the alternator 1;

analogue filtering 30 (voltage anti-ripple, anti-aliasing filter), associated with the analogue-digital converter 31 and voltage divider 30 in order to adapt the voltage level for the analogue-digital converter 31;

analogue-digital converter 31;

means 13 for calculation of error between the measurement signal $U_m$ and the set value $U_o$;

digital order 32 which generates the set value $U_o$ required;

anti-aliasing filter 33 associated with the decimation induced by the generation of the PWM control signal;

first amplifier 14 of the proportional part of the control loop 10 (proportional gain $K_p$ designed to guarantee the stability of the regulator device 2 connected to the alternator 1 connected to the battery 7);

adder block 16 between the proportional part 14 and the integral part 23;

saturation block 17 making it possible to adapt the format of the data of the control loop 10 to that of the means 35 for generation of the PWM control signal between a minimum value $Y_{min}$ and a maximum value $Y_{max}$;

means 35 for generation of the PWM control signal (controlling the means 11 for control of the excitation current $I_e$ of the alternator 1), carried out by a comparison between a triangular reference signal (also known as a "sawtooth" signal) and the control signal $Y_{sat}$ obtained from the saturation block 17;

switch 36 which connects or disconnects the integral part 23 according to a disconnection signal Cmd generated by the saturation block 17;

second amplifier 20 (with an integrator gain $K_i$ which is designed to guarantee the stability of the control device 2 connected to the alternator 1 connected to the battery 7);

very low-frequency low-pass cut-off frequency low-pass filter 34 which forms the integral part 23 of the control loop 10;

disconnection signal Cmd of the switch 36 representing the saturation of the control loop 10 generated by the saturation block 17;

PWM control signal controlling the power electronics 11 controlling the excitation current of the alternator 1;

phase advance filter 24 (designed to guarantee the stability of the control subassembly connected to the alternator 1 and connected to the battery 7).

This phase advance filter 24 has the essential characteristic of having a significant positive phase on a given frequency band. Its nominal cut-off frequency $f_c$ is designed to obtain a maximum phase advance in the control loop 10 in order to obtain, on the transfer function in an open loop of the control system, a maximum gain margin and phase margin.

In the preferred embodiment of the invention, the control loop 10 is a proportional integral control loop 14, 23 which, unlike the control loops known in the prior art (such as the one shown in FIG. 2) additionally comprises an anti-saturation system with conditional detection 36, which makes it possible to optimise the time of return to the non-saturated mode.

The integral part 23 of the control loop 10 comprising the second amplifier 20 and the integrator 34 is connected or disconnected by the saturation block 17 according to the state of saturation of the control signal $Y_{sat}$.

For this purpose, the saturation block 17 generates a disconnection signal Cmd controlling the switch 36 which applies to the input of the second amplifier 20 either the error signal e or a zero voltage by earthing 37.

The detection of the saturation in the saturation block 17 is implemented by a numerical algorithm which uses the following signals:

Y: intermediate control signal at the input of the saturation block 17;

$Y_{sat}$: control signal at the output of the saturation block 17;

Cmd: disconnection control signal.

The saturation detection algorithm is:

IF ($Y=Y_{sat}$) THEN $Cmd=0$

OTHERWISE $Cmd=1$

The functioning of this anti-saturation system in the proportional integral control loop 10 is then as follows:

Non-Saturated Mode

When the disconnection signal Cmd is in a zero logic state, the non-saturated mode is detected. The switch 36 connects the error signal e to the input of the integral part 23 (i.e. with the second integrator gain $K_1$ amplifier 20 in series with the low-pass filter 34 which carries out the integration function 15). The anti-saturation system is considered to be disconnected.

Mathematically:

IF ($Y=Y_{sat}$) THEN $Cmd=0$ and $e_1=e$ where $e_i$ is the intermediate error signal at the input of the second amplifier 20 preceding the low-pass filter 34.

Saturated Mode

When the control signal Cmd is in the logic state 1, the saturated mode is detected. The switch 36 then connects the input of the integral part 23 to a zero voltage in order to stop the development of output voltage $s_i$ of the integral part 23.

Mathematically:

IF ($Y \neq Y_{sat}$) THEN $Cmd=1$ and $e_i=0$.

The output voltage $s_i$ of the integral part 23 remains fixed at a constant value during the saturated mode.

In fact, a pure integration operator carries out a non-limited operation relative to the time [0, +∞[ defined by the mathematical function:

$$s_i = K_i \cdot \int_0^{+\infty} (e_i) \cdot dt$$

As a result, $s_i$ is equal to the value of $s_i$ at the moment of transition to saturated mode.

However, a pure numerical integrator with a first transfer function with the form (transformed into Z):

$$FT0(z) = \frac{c}{1 - Z^{-1}}$$

can be replaced by a second transfer function digital low-pass filter 34 with the form:

$$FT1(z) = \frac{d}{1 - (1-d) \cdot Z^{-1}}$$

with identical behaviour.

For example, lines on the Bode plane carried out by the transformation $$Z(f) = e^{j \cdot 2\pi \frac{f}{fe}}$$

and parameters $$c = \frac{1}{2^{20}}$$

and $$d = \frac{1}{2^{20}}$$

with a sampling frequency of $f_e$=100 KHz show that beyond 30 MHz, the behaviour of the low-pass filter 34 and that of the pure integrator 15 are identical.

The inventive body has been able to determine that the implementation in an alternator 1 which outputs 300 A of a digital regulator device 2 comprising a control loop 10 as described above with a phase advance filter 24 with a nominal cut-off frequency $f_c$ substantially equal to 22 Hz made it possible to obtain a maximum gain margin substantially equal to 22 dB, and a maximum phase margin substantially equal to 80°.

It will be appreciated that the above description would apply in similar terms to rotary electrical machine models with excitation other than the three-phase alternator represented in FIG. 1.

The numerical values indicated correspond to experimental developments and computer simulations carried out by the applicant company, and are provided purely by way of example.

The location of the phase advance filter 24 in the proportional part 14 of the control loop 10 is also only an example corresponding to a preferred embodiment of the invention; other locations in the control loop 10 can be provided as an alternative, and would provide similar advantages in terms of phase and gain margins for high-power machines 1.

The invention thus incorporates all the possible variant embodiments which would remain within the scope defined by the following claims.

The invention claimed is:

1. Control loop (10) of a digital control device (2) of a rotary electrical machine with excitation (1) for a motor vehicle of the type which can function as a generator supplying an output voltage ($U_b$+) adjusted by an excitation current ($I_e$), said digital control device (2) comprising means (11) for controlling said excitation current ($I_e$) and said control loop (10) comprising, as input, means (31) for measurement by sampling of said output voltage ($U_b$+) generating a measurement signal ($U_m$), means (13) for error calculation generating an error signal (e) equal to a difference between said measurement signal ($U_m$) and a set value ($U_0$), means (14) for processing of said error signal (e) comprising an amplifier (14) and generating a control signal ($Y_{sat}$), and, as output, means (35) for generation of a control signal (PWM) which controls said control means (11) according to said control signal ($Y_{sat}$), wherein said processing means (14, 24) additionally comprise a phase advance filter (24), said phase advance filter (24) having a transfer function at Z which has the form:

$$FT(z) = \frac{1-(1-1/a)\cdot Z^{-1}}{1-(1-1/b)\cdot Z^{-1}}$$

where a is a first predetermined coefficient and b is a second predetermined coefficient such that a>b, and said phase advance filter (24) comprises means for implementation of a recurrence equation, said recurrence equation having the form:

$$Y_{n+1} = Y_n Z^{-1} - Y_n Z^{-1} 1/b + X_n - X_n Z^{-1} + X_n Z^{-1} 1/a$$

where X and Y are respectively a digital input and a digital output of said phase advance filter (24), and a and b are respectively said first and second predetermined coefficients.

2. Control loop (10) of a digital control device (2) of a rotary electrical machine with excitation (1) for a motor vehicle according to claim 1, wherein said means (25, 26) for implementation comprise a multiplier (25) by a predetermined factor at the input of said phase advance filter (24), and a divider (26) by said predetermined factor at the output.

3. Control loop (10) of a digital control device (2) of a rotary electrical machine with excitation (1) for a motor vehicle according to claim 2, wherein said means (25, 26, 27, 28, 29) for implementation additionally comprise an adder (27) and elements (28, 29) for multiplication by values which are the inverse of said first and second predetermined coefficients.

4. Control loop (10) of a digital control device (2) of a rotary electrical machine with excitation (1) for a motor vehicle according to claim 3, wherein said phase advance filter (24) is in series with said amplifier (14).

5. Control loop (10) of a digital control device (2) of a rotary electrical machine with excitation (1) for a motor vehicle according to claim 3, wherein said phase advance filter (24) has a nominal cut-off frequency ($f_c$) which is substantially equal to 22 Hz, a transfer function in an open loop of said digital control device with a gain margin substantially equal to 22 dB, and a phase margin substantially equal to 80°.

6. Control loop (10) of a digital control device (2) of a rotary electrical machine with excitation (1) for a motor vehicle according to claim 2, wherein said phase advance filter (24) is in series with said amplifier (14).

7. Control loop (10) of a digital control device (2) of a rotary electrical machine with excitation (1) for a motor vehicle according to claim 2, wherein said phase advance filter (24) has a nominal cut-off frequency ($f_c$) which is substantially equal to 22 Hz, a transfer function in an open loop of said digital control device with a gain margin substantially equal to 22 dB, and a phase margin substantially equal to 80°.

8. Control loop (10) of a digital control device (2) of a rotary electrical machine with excitation (1) for a motor vehicle according to claim 1, wherein said phase advance filter (24) is in series with said amplifier (14).

9. Control loop (10) of a digital control device (2) of a rotary electrical machine with excitation (1) for a motor vehicle according to claim 8, wherein said means (14, 24, 34) for processing additionally comprise an integrator (34) in parallel with said amplifier (14) and said phase advance filter (24).

10. Control loop (10) of a digital control device (2) of a rotary electrical machine with excitation (1) for a motor vehicle according to claim 9, wherein said processing means (14, 17, 24, 34) additionally comprise a saturation block (17) which generates a disconnection signal (Cmd) controlling a switch (36) which disconnects said integrator (34) of said error calculation means (13) in the case of detection of a state of saturation of said control signal ($Y_{sat}$).

11. Control loop (10) of a digital control device (2) of a rotary electrical machine with excitation (1) for a motor vehicle according to claim 10, wherein said integrator (34) is a low-pass filter (34).

12. Control loop (10) of a digital control device (2) of a rotary electrical machine with excitation (1) for a motor vehicle according to claim 10, wherein said phase advance filter (24) has a nominal cut-off frequency ($f_c$) which is substantially equal to 22 Hz, a transfer function in an open loop of said digital control device with a gain margin substantially equal to 22 dB, and a phase margin substantially equal to 80°.

13. Control loop (10) of a digital control device (2) of a rotary electrical machine with excitation (1) for a motor vehicle according to claim 9, wherein said integrator (34) is a low-pass filter (34).

14. Control loop (10) of a digital control device (2) of a rotary electrical machine with excitation (1) for a motor vehicle according to claim 13, wherein said phase advance filter (24) has a nominal cut-off frequency ($f_c$) which is substantially equal to 22 Hz, a transfer function in an open loop of said digital control device with a gain margin substantially equal to 22 dB, and a phase margin substantially equal to 80°.

15. Control loop (10) of a digital control device (2) of a rotary electrical machine with excitation (1) for a motor vehicle according to claim 9, wherein said phase advance filter (24) has a nominal cut-off frequency ($f_c$) which is substantially equal to 22 Hz, a transfer function in an open loop of said digital control device with a gain margin substantially equal to 22 dB, and a phase margin substantially equal to 80°.

16. Control loop (10) of a digital control device (2) of a rotary electrical machine with excitation (1) for a motor vehicle according to claim 8, wherein said phase advance filter (24) has a nominal cut-off frequency ($f_c$) which is substantially equal to 22 Hz, a transfer function in an open loop of said digital control device with a gain margin substantially equal to 22 dB, and a phase margin substantially equal to 80°.

17. Control loop (10) of a digital control device (2) of a rotary electrical machine with excitation (1) for a motor vehicle according to claim 1, wherein said phase advance filter (24) has a nominal cut-off frequency ($f_c$) which is substantially equal to 22 Hz, a transfer function in an open loop of said digital control device with a gain margin substantially equal to 22 dB, and a phase margin substantially equal to 80°.

18. Digital control device (2) of a rotary electrical machine with excitation (1) for a motor vehicle, of the type which can function as a generator, comprising a control loop (10) according to claim 1.

19. Rotary electrical machine with excitation (1) for a motor vehicle of the type which can function as a generator, comprising a digital control device (2) according to claim 18.

* * * * *